July 7, 1959  T. M. S. GIBSON  2,893,432
FLUID FLOW CONTROL
Filed Dec. 31, 1953  2 Sheets-Sheet 1
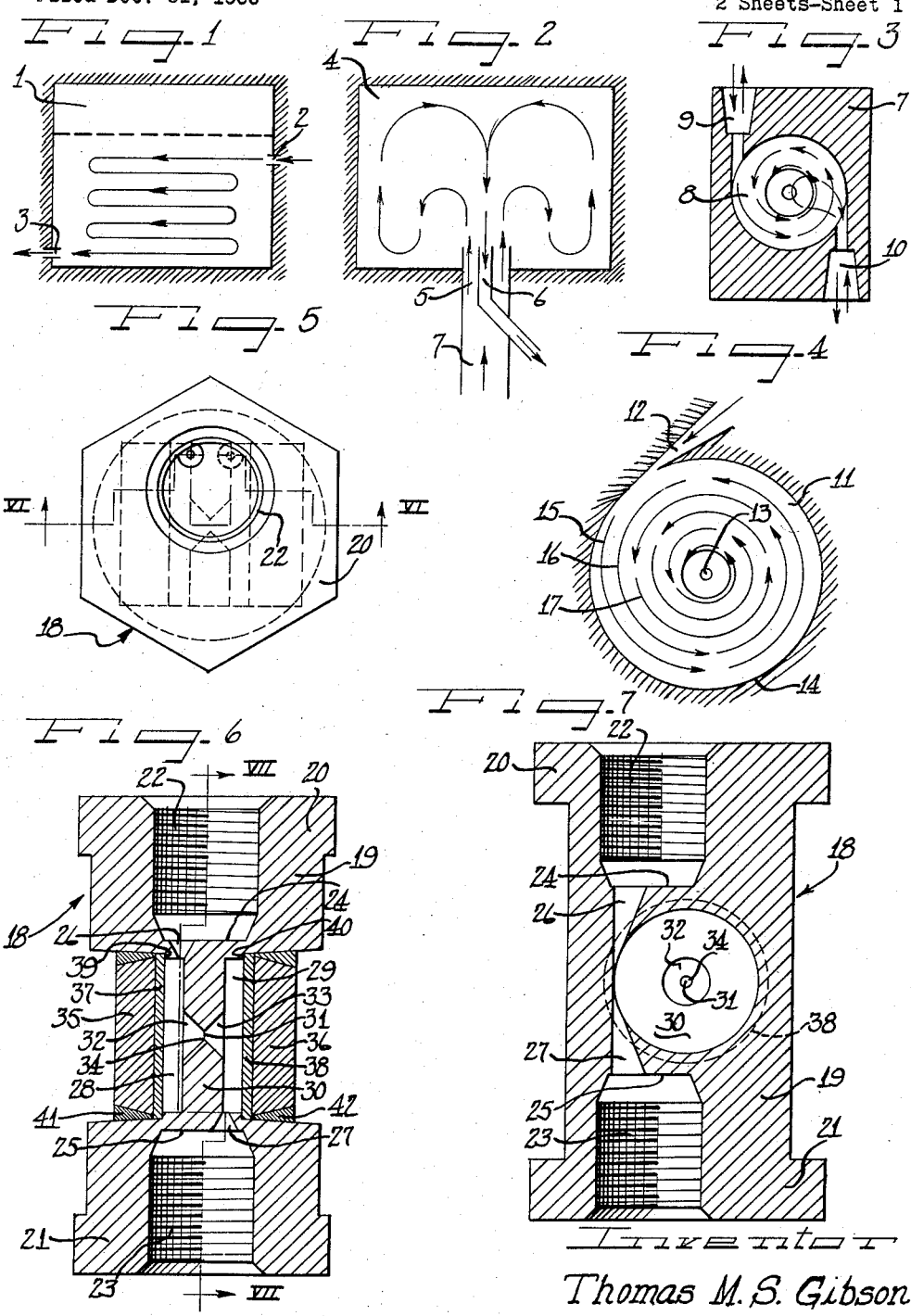
Inventor
Thomas M. S. Gibson July 7, 1959

T. M. S. GIBSON 2,893,432

FLUID FLOW CONTROL

Filed Dec. 31, 1953

Inventor
Thomas M.S. Gibson

# United States Patent Office 2,893,432
Patented July 7, 1959

2,893,432

FLUID FLOW CONTROL

Thomas M. S. Gibson, Milwaukee, Wis., assignor to The Dole Valve Company, Chicago, Ill., a corporation of Illinois Application December 31, 1953, Serial No. 401,673

2 Claims. (Cl. 138—26)

The present invention relates to fluid flow control, and more particularly relates to method and apparatus to govern fluid flow pressures and rates and to restrict or reduce the same.

Fluid flow control devices and methods of both the hydraulic and pneumatic varieties for relatively high pressure fluids flowing at relatively high flow rates, such as 3,000 to 5,000 pounds per square inch pressure flowing at a rate on the order of about 1,200 feet per second, has heretofore been effected through the utilization of extremely complex, costly, bulky, heavy, and single purpose restrictor devices which required substantially continuous maintenance including general servicing and parts replacement.

An example of such heretofore known devices are the restrictor valves used in civil and military aircraft for control of the hydraulic fluid flow at numerous places about a single aircraft fluid system. These devices for restricting fluid flow and to reduce the pressure thereof have had all of the aforementioned difficulties since they included very small orifices on the order of about .020 inch diameter which required frequent servicing and cleaning since they were well within the clogging range, and filters as well as piston control elements and biasing springs and the like with threaded sections of housings or casings permitting access to the several parts and O-ring sealing members to prevent escape of the hydraulic fluid from between the threaded parts of the housings and casings.

Dissatisfaction with this type of flow control and restrictor obtained for obvious reasons. Similar reasons and dissatisfactions accompanied the utilization of many of the other heretofore known types of flow control and restrictor devices.

By the principles of the present invention, however, the aforementioned difficulties encountered are obviated and there is provided fluid flow control restrictor devices and the like which, among others, may be utilized for hydraulic restrictors, flow regulators, flow controls, pressure governors and regulators of either the hydraulic or pneumatic varieties, recoil controls and the like, and mufflers and the like. Further, these devices may be light weight, having minimum size, be manufactured at low cost, be substantially insensitive to fluid viscosity, have orifices which are without the clogging range, have a wide range of orifice diameters, be extremely reliable under all service conditions, have substantially the same coefficient of discharge at all rated temperatures, be provided with end bosses adaptable to standard fittings, and be manufactured as an all one piece welded construction of long life subject only to the wear resulting from fluid flow therethrough.

Accordingly, it is an important object of the present invention to provide a new and improved fluid flow control method and apparatus operable to utilize fluid flow energies to regulate the fluid flow.

Another important object of the present invention is to provide a new and improved flow restrictor and method of fluid flow restriction control wherein fluid flow is directed into a turbulence chamber wherein the fluid agitates itself to reduce its pressure and fluid flow rate.

Still another important object of the present invention is to provide a new and improved method of fluid flow control and restriction and apparatus therefor operable to cause the fluid to confront itself and thereby reduce its pressure and fluid flow rate through hysteresis or internal energy losses.

Still another important object of the present invention is to provide new and improved fluid flow control method and apparatus wherein fluid flow is directed into a substantially cylindrical chamber tangentially to the outer wall thereof whereby the fluid flow will follow a centripetal path and be discharged axially from the chamber at reduced pressure and flow rate by virtue of the energy lost through turbulence and the like within the chamber.

Still another object of the present invention is to provide method and apparatus of the class described wherein flow restriction and control is accomplished bi-directionally in a fluid flow system.

Still another object of the present invention is to provide fluid flow control and apparatus of the class described wherein fluid flow is restrictively controlled in one direction of flow and is permitted unrestricted passage in an opposite direction.

Still another object of the present invention is to provide fluid flow control method and apparatus of the class described wherein the pressure and fluid flow rate of fluid within a system may be reduced through a series of reduction steps.

Yet another object of the present invention is to provide self cooling and self control and restriction fluid flow control device and method operative in accordance with the principles of the present invention.

Yet other objects, features and advantages of the present invention become readily apparent from the following detailed description of the principles of the present invention and a preferred embodiment thereof, from the claims, and from the accompanying drawings in which each and every detail shown is fully and completely disclosed as a part of this specification, in which like reference numerals refer to like parts, and in which:

Figure 1 is a diagrammatic illustration of an embodiment of the principles of the present invention wherein fluid flow is controlled and governed by turbulently and self regulating its pressure and flow rate;

Figure 2 is a diagrammatic illustration of another form embodying the principles of the present invention by forcing the fluid back upon itself to retard and control its own flow;

Figure 3 is a diagrammatic illustration of a two-way centripetal flow control and restrictor embodying the principles of the present invention;

Figure 4 is a diagrammatic illustration of still another form of centripetal control and regulator;

Figure 5 is an en elevational view of a preferred structural embodiment of the principles of the present invention;

Figure 6 is a longitudinal sectional view of the structural embodiment of Figure 5 and is taken substantially along the broken section line VI—VI of Figure 5;

Figure 7 is a longitudinal sectional view of the structural embodiment of Figure 5 and Figure 6 taken substantially along the broken section line VII—VII of Figure 6;

Figure 8:
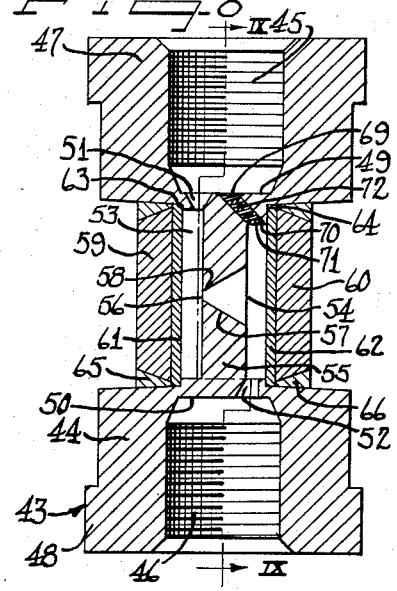
Figure 8 is a diagrammatic longitudinal sectional view of a one-way restrictor control embodying the principles of the present invention and is similar to the sectional view of Figure 6.

In accordance with the principles of the present invention a high pressure and/or high flow rate of fluid in a fluid system may be caused to automatically restrict itself to reduce the fluid pressure and/or reduce its flow rate at controllable points in the system. One such system is the hydraulic system of aircraft and the like, and although many of the embodiments of the present invention hereinafter described in detail will be described with regard to their applicability to restriction and flow control and the like of hydraulic fluids, it will be understood that this is only exemplary and that the principles of the present invention and the embodiments thereof herein described and illustrated are of general applicability to fluid systems generally.

In Figure 1 there is illustrated schematically and diagrammatically a tank 1 which is substantially enclosed except for an inlet port 2 and an outlet port 3 which ports are so displaced that the lines defined by the direction of flow therethrough are different from each other. If fluid is directed through the inlet port 2 into the confining chamber of tank 1 at such high pressure and high velocities as may be found in an aircraft fluid system, currently with pressures ranging from 3,000 to 5,000 pounds per square inch and the velocity being on the order of about 1,200 feet per second, the fluid will be subjected to high turbulence within the chamber since the ports 2 and 3 are not aligned. The turbulence in the chamber will cause the fluid to be forced back upon itself many times in flowing from the inlet port 2 to the outlet port 3 and will thereby expend or dissipate a large portion of the internal energy or kinetic energy within the fluid to thereby effect a substantial reduction in fluid pressure at the outlet port 3.

A similar expenditure of fluid kinetic energy with a resultant fluid pressure drop and/or fluid velocity reduction may be effected by orienting the inlet and outlet ports so that fluid flow therethrough will be in opposite directions as schematically and diagrammatically illustrated in Figure 2. In this embodiment of the principles of the present invention, a tank 4 is provided with an inlet 5 which is substantially coaxial with the outlet 6 whereby fluid flow from the inlet 5 flowing along the path indicated by the arrows within the tank 4 will be turbulent and expend a high portion of the kinetic energies in the fluid before the fluid reaches the outlet port 6. Further, the fluid flowing toward the outlet 6 will confront and buck against the fluid entering the tank 4 from the inlet 5 and therefore aid in reducing the fluid pressure and/or the fluid flow rate.

In the embodiments of Figures 1 and 2 the fluid flow is turbulently confined to a turbulence pool and enters and exits the pool through intentionally misaligned inlet and outlet ports respectively whereby the fluid flow itself will create the turbulence within the pool and thereby automatically restrict itself to reduce its pressure and bar its flow rate.

In Figure 3, however, there is diagrammatically illustrated a bi-directionally operative centripetal flow control and restriction device embodying the principles of the present invention. As shown in Figure 3 a control block or the like 7 is provided with a relatively shallow cylindrical hollow 8 with ports 9 and 10 leading thereto from outside the block 7. The ports 9 and 10 may each be an outlet port or an inlet port, as desired, and as indicated by the bi-directional arrows of the drawings. Assuming that the port 9 is utilized as the inlet port, for purposes of example and explanation, then the port 10 will be the outlet port. Each of the ports 9 and 10 lead to the cylindrical chamber 8 and communicate therewith substantially tangentially so that fluid flowing at high pressure and high velocity into the inlet port and therethrough will tangentially enter the cylindrical chamber 8 and centripetally flow therethrough toward the center or axis thereof where it will be confined and forced back upon itself to create a very high turbulence state within the turbulence chamber 8 before the fluid may flow to the outlet port 10 at reduced pressure or reduced velocity.

For a better understanding of centripetal operation in accordance with the principles of the present invention, reference is made to Figure 4 wherein another form of the invention is illustrated and which utilizes these principles. In this form of the invention a substantially cylindrical turbulence chamber 11 is provided with a substantially tangentially directed inlet port 12 and a substantially axially directed outlet port 13 (again, it may be seen that the inlet port and the outlet port are intentionally misaligned or intentionally differently directed just as in Figures 1, 2 and 3 wherein the inlet port and outlet port are misaligned, oppositely directed, and misaligned and oppositely directed respectively). In the centripetal restrictor and control device of Figure 4 fluid is supplied through the inlet port 12 at a high pressure and at a high flow rate and fed into the turbulence chamber 11 substantially tangential to the substantially cylindrical side wall 14 thereof to follow a path as indicated by the first arrow 15 along the wall 14, and it will continue circumferentially around the cylindrical wall 14 until it again reaches the inlet port 12. During its high pressure and high velocity trip around the turbulence chamber 11 the fluid will lose a part of its energy due to continuous direction change and friction and the like. If we assume that its input energy was, for example, Q and that its losses were "$l$," then the energy of the fluid as it approaches the inlet port 12 within the turbulence chamber 11 may be assumed to be $Q_1$.

Since there is a loss in the internal energy of the fluid flowing about the turbulence chamber 11, there will also be a pressure loss in the fluid.

When the fluid reaches the inlet 12 at its circuitous flow about the turbulence chamber 11 it will collide with fresh fluid entering through the inlet 12 which will be at a higher pressure and a higher internal energy having not yet sustained any pressure energy losses. As a result of this collision at the end of its first trip around it is compelled to bow to the fresh fluid and bend radially inwardly to race for its second trip around the chamber on a smaller radius path such as indicated by the arrow 16. Although this path is smaller the initial entering fluid will continuously press outwardly against the new fluid now following the path 15. At the end of this complete cycle it will have lost additional energy and additional pressure and again be bent further inwardly to follow the path indicated by the arrow 17. This course will continue until the fluid has reached the center or the outlet port 13 where it will have no further radially inwardly path to assume and will therefore be forced to back up upon itself creating an extremely high turbulence within the chamber before it flows axially outwardly therefrom through the outlet port 13.

By the utilization of this form of centripetal restrictor and control employing the methods herein above described, the fluid will automatically restrict itself and reduce its pressure and/or flow rate. An example of such restriction is such that fluid entering through the inlet port at about 3,000 pounds per square inch flowing at a rate of about 1,200 feet per second, will flow outwardly through the outlet port 13 at a rate of about 300 feet per second and/or at 1,200 pounds per square inch pressure. While flowing through the turbulence chamber 11 the fluid will turn around at a rate of about 60,000 revolutions per minute under the conditions of the immediately herein above described example.

It has been found to be highly advantageous to feed the fluid from the outlet port 13 through a knife edge type orifice into a low turbulence chamber before delivering the fluid to a final outlet from the control and restrictor device. Such a structural embodiment of the principles of the present invention utilizing the methods of the present invention is illustrated in detail in Figures 5, 6 and 7.

In the embodiment of Figures 5, 6 and 7 there is illustrated a bi-directional flow restrictor and control device 18 which has been constructed in the form of a direct straight coupling unit which is readily connectable to fluid lines or tubes or pipes or the like thereby providing much improved convenience of assembly of the restrictor into a fluid supply system. The restrictor device 18 has a housing 19 which has polygonal ends 20 and 21 facilitating convenient tool acceptance for coupling the restrictor into a fluid line. The housing or body 19 is further provided with opposed preferably threaded axially extending eccentric aligned recesses 22 and 23 therein for coupling the same into fluid supply lines and providing convenient inlets and outlets respectively depending upon the direction of flow through the restrictor 18.

The inlet and outlet recesses 22 and 23 do not extend entirely through the housing or casing 19, as they would in an ordinary plumbing fitting, but are bottomed as at 24 and 25 respectively and each of the bottoms of the recesses 22 and 23 has an aperture, 26 and 27 respectively, leading from the inlet and outlet recesses to substantially cylindrical turbulence and restriction chambers 28 and 29 respectively. The turbulency and restriction chambers 28 and 29 are cylindrical and relatively thin and the entrance and exit ports 26 and 27 are so disposed as to direct fluid tangentially into the restriction chambers and turbulence chambers substantially in the same manner as was described herein above in conjunction with Figure 4.

The turbulence chambers 28 and 29 are formed by an orifice wall 30 extending axially through the housing or casing 19 between the inlet and outlet recesses 22 and 23 diametrically of the wall and disposed centrally between the turbulence chambers 28 and 29 axially of those chambers. Coaxially with the center axis of the turbulence chambers 28 and 29, the orifice wall 30 is provided with a knife edge restriction orifice 31. The faces of the orifice wall 30 are preferably conically tapered as at 32 and 33 restricting toward the knife edge orifice 31 to provide the orifice with an annular knife edge defining the same as at 34.

The annular side walls of the turbulence chambers 28 and 29 are provided by drilling or boring radially into the housing 19 coaxially with the orifice 31, or by casting the casing 19 in such a manner as to be provided with diametrically opposed substantially cylindrical recesses which may be finished to provide the cylindrical walls of the turbulence chambers 28 and 29 and to finish the faces of the orifice wall. It is while these radial recesses are open that the orifice 31 and tapered faces 32 and 33 providing the knife edge 34 may be machined or the like thereon.

Thereafter, plug members 35 and 36 having turbulence chamber face plates 37 and 38 welded or otherwise firmly secured thereto, are seated against shoulders 39 and 40 radially about the cylindrical side walls of the chambers 28 and 29. These plugs and their associated face plates are thereafter securely welded in place by scarf welds and the like as is shown at 41 and 42 to firmly and permanently secure the same in place positively and accurately.

This restriction of flow control device 18 operates to reduce fluid pressure and/or its flow rate in a manner substantially identical to that described herein above in conjunction with Figure 4 but is further bi-directionally operable so that fluid flow may be restricted both while flowing from the recess 22 to the recess 23 and while flowing from the recess 23 to the recess 22. In the first instance fluid will enter the recess 22, pass through the turbulence chamber inlet port 26 into the turbulence chamber 28 and there follow a centripetal path converging upon the knife edge orifice 31 with high turbulence loss and thereby high energy and high pressure loss due to being forced back upon itself under high fluid pressure. The fluid will then flow through the small knife edge orifice 31 (which is sufficiently large in its diameter to pass particles and the like which would tend to clog smaller orifices) and into the low turbulence chamber 29 from which it passes into the exit port 27 and into the outlet recess 23.

It will be readily observed that during flow from the recess 23 to the recess 22 the fluid will enter the turbulence chamber 29 tangentially and at a high speed and under high pressure where it will be reduced in energy and pressure before flow through the orifice 31 after its centripetal flow within the high turbulence chamber 29. Thereafter the fluid will pass into the now low turbulent chamber 28 where it will receive a small second pressure and energy drop and from there flow outwardly from the aperture 26 and the recess 22.

Figure 9:
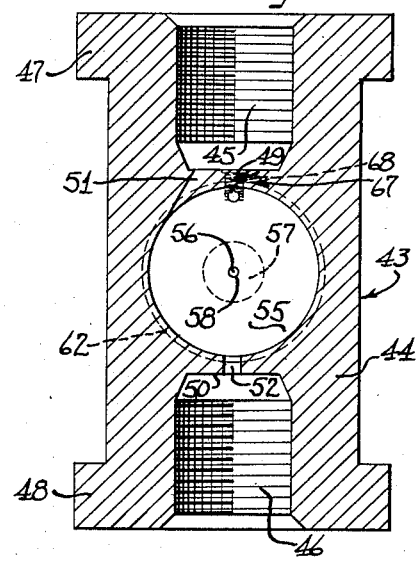
Figure 9 is a longitudinal sectional view of the controller restrictor of Figure 8 and is taken substantially along the broken sectional line IX—IX.

A substantially similar device 43 is illustrated in Figures 8 and 9 except that the device 43 for the restriction of fluid flow to reduce its pressure and/or flow rate is operable as a restrictor for fluid flow in one direction therethrough while it permits the passage of fluid substantially unrestricted in the opposite direction. Further check means may be provided within the unit for preventing unrestricted flow in the direction in which restriction is attended by the use of the device 43.

To this end the device is provided with a straight coupling like housing or casing 44 which is substantially axially recessed as at 45 and 46 axially inwardly from the tool receiving end portions 47 and 48 respectively. These recesses 45 and 46 also are preferably threaded or the like to provide convenient coupling into fluid lines carrying fluid under high pressure and/or at a high flow rate. The bottoms 49 and 50 of the recesses 45 and 46 are apertured as at 51 and 52 respectively and these apertures 51 or 52 lead to substantially centrally disposed turbulence chambers 53 and 54.

The aperture 51, however, enters the cylindrical high turbulence chamber 53 substantially tangentially thereof to provide for fluid resriction in the manner discussed in conjunction with Figure 4. This construction is substantially similar to that shown in Figures 6 and 7 with particular regard being paid to the fluid entrance port 26 and the high turbulence chamber 28. That is, the turbulence chambers 53 and 54 have an axis which is radial with respect to the axis of the housing or casing 44. A central orifice wall 55 has a knife edge orifice 56 therein substantially coaxial with the high turbulence chamber 53 and the chamber 54 and is conically tapered from the chamber 54 to the chamber 53, as at 57 to provide a knife edge 58 about the outlet orifice 56 from the high turbulence chamber 53. The chambers 53 and 54 are provided by coaxial radial bores in the housing or casing 44 thereby permitting efficient machining of the cylindrical side walls of the chambers and of the faces of the orifice wall 55. Plugs 59 and 60 having chamber faces 61 and 62 secured to the inward faces of the plugs as by welding or the like are seated on shoulders 63 and 64 to accurately define the chambers 53 and 54 and are then positively and accurately secured in place as by welds 65 and 66.

Fluid flow into the inlet recess 45 will pass through the aperture 51 tangentially into the high turbulence chamber 53 and there be restricted for energy and pressure losses in the manner described before passing through the knife edge orifice 56 into the low turbulence chamber 54 from which the fluid will flow outwardly through the outlet port 52 and the outlet recess 46.

Fluid flow through the restrictor device of Figures 8 and 9 in a direction from the threaded coupling recess 46 to the threaded coupling recess 45 does not, however, flow through the knife edge orifice 56 from the low turbulence chamber 54 into which the fluid passes from the orifice 52. The path of the fluid flow in this reverse direction is a path which includes a one-way or ball check valve 67 in an annular aperture passage 68 providing for a fluid flow from the low turbulence chamber 54 to the center coupling recess 45. The annular aperture 68 extends between the bottom 49 of the center coupling recess 45 and the cylindrical side wall of the low turbulence chamber 54 and is by preference substantially axially parallel to the major axis of the restrictor unit 43. Further, the annular aperture 68 is also substantially coaxial with the port 52 extending between the bottom 50 of the center coupling recess 46 and the cylindrical side wall of the low turbulence chamber 54 substantially diametrically opposed to the aperture 68.

By substantially aligning the port 52 and the aperture 68 fluid flow in the reverse direction will be substantially unrestricted. To properly operate the device in the restrictive direction, however, means is provided in the aperture 68 to prevent fluid flow therethrough from the coupling recess 45. To this end, the axial extreme end portions of the aperture 68 are shouldered as at 69 and 70. The shoulder 70 at the junction of the aperture 68 with the cylindrical side wall of the low turbulence chamber 54 is operative as a ball valve seat and a check valve ball 71 is biased and seated thereagainst within the aperture 68 by a check valve biasing spring 72. The shoulder 69 at the junction between the coupling recess 45 and the aperture 68 may be provided by a small snap ring or the like and functions to retain the valve spring 72 in place and biased against the ball 71 irrespective of the orientation of the one-way restrictor 43.

Thus, it will be observed that fluid flow from the coupling recess 45 to the coupling recess 46 is restricted and the pressure and/or flow rate thereof is controlled in the manner described herein above in conjunction with Figure 4 while flow in a reverse direction is substantially unrestricted and unseats the ball 71 from the seat 70 and flows through the aperture 68. Of course, while fluid is flowing in a reverse direction a small percentage of the same may flow through the knife edge orifice 56 at the chamber 53 face of the orifice wall 55 and thence to the center coupling recess 45 with a small restriction thereof, but this flow will be of minor consequence and will not cause any great restriction of reverse direction flow.

It will also be understood in connection with this invention that in some instances greater restriction is required than the restriction provided by any single pair of high and low restriction chambers coupled together through a knife edge orifice or the like. In some instances such as in aircraft hydraulic systems it is highly desirable to reduce the hydraulic line pressure from an extremely high value to an extremely low value within a very small space length.

Figure 11:
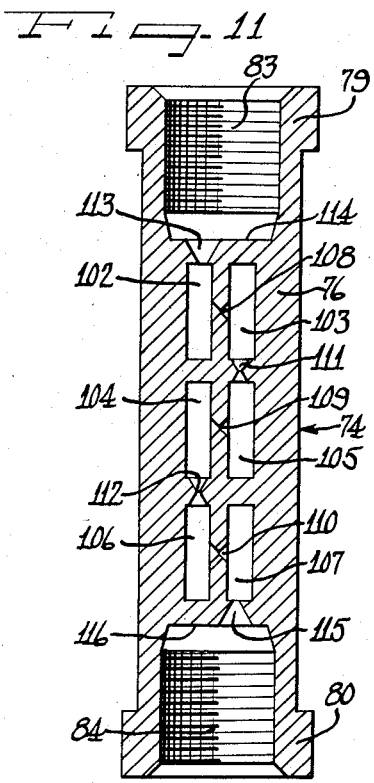
Figure 11 is a diagrammatic longitudinal sectional view of a series two-way control restrictor.
Figure 10:
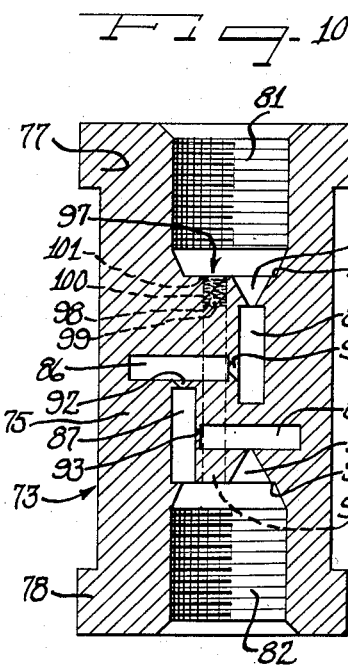
Figure 10 is a diagrammatic sectional view of a series one-way control restrictor.

A one-way compound restrictor operable to accomplish this end is shown at 73 in Figure 10. Also to this end, there is illustrated a bi-directional compound restrictor 74 in Figure 11.

Each of the restrictors 73 and 74 are provided with direct coupling type housings or casings 75 and 76 respectively with tool accepting end portions 77, 78 and 79, 80 respectively substantially similar to the casings and their ends of Figures 7 and 9 respectively. Further, each of these restrictors has axially aligned opposed threaded coupling recesses 81, 82 and 83, 84 respectively.

The compound restrictor 73 of Figure 10, however, is shown as a four-stage resistor unit having four high turbulence chambers 85, 86, 87 and 88 each of which are entered tangentially in the fluid flow path direction leading from the coupling means 81 to the coupling recess 82, and each of which are exited axially in that same fluid flow path direction. Further, the high turbulence chambers 85, 86, 87 and 88 are intercoupled as series restriction stages in that same fluid flow path direction.

Each of the restriction chambers 85 through 88 are cylindrical and have a relatively short axial dimension whereby fluid flow entering the same tangentially and exiting therefrom axially will be restricted as described in conjunction with Figure 4 as set forth herein above. The first high turbulence restriction chamber 85 is entered through an inlet port aperture 89 extending between the bottom face 90 of the coupling recess 81 and the cylindrical side wall of the first high tubulence chamber 85 and enters the first high turbulence chamber 85 substantially tangentially thereof.

An outlet substantially knife edge orifice 91 axially directed from the first high turbulence chamber 85 also functions as an inlet port to the second high turbulence chamber 86 and directs fluid flow tangentially thereinto from the first restriction chamber 85.

An axial substantially knife edge orifice 92 leading from the second high turbulence restriction chamber 86 directs fluid flow axially therefrom and substantially tangentially into the cylindrical third turbulence restrictor chamber 87. An axial substantially knife edge orifice 93 directs fluid flow axially from the third chamber 87 substantially tangentially into the fourth restriction chamber stage 88 for centripetal flow therethrough to a substantially knife edge outlet port 94 extending axially from the chamber 88 to the center coupling recess 82 and through the bottom 95 thereof.

Fluid flow through the restrictor 73 from its coupling end 81 to its coupling end 82 is thus restricted and subjected to energy losses and pressure losses through four centripetal stages each of which is operative to reduce the fluid pressure and/or flow rate automatically by forcing the fluid back upon itself and utilizing its own high internal energy to restrict itself. The restrictor 73 is exemplary of any number of restriction stages within a single restrictor unit and is, of course, not limited to the four stages of restriction as shown for fluid flow in one direction.

Fluid flow in the other direction, in a reverse direction, is substantially unrestricted, however, by the provision of a fluid flow tube 96 extending through the restrictor 73 from the coupling end 82 to the coupling end 81 on an axis which is substantially parallel to the major axis of the multi-stage unidirectional restrictor 73. At one end of the flow tube 96, and by reference adjacent to the outside of coupling recess 81, a ball type check valve 97 substantially identical to the valve 67 of Figures 8 and 9 is provided in the tube 96 to prevent fluid flow to the tube in the restricted direction. To this end, the unrestricted flow tube 96 is provided with a shoulder 98 operative as a check valve ball seat for the ball 99 which is biased thereagainst by a check valve biasing spring 100 that is retained in bias relation against the ball 99 by a second shoulder 101 at the opposite end of the spring and which may be provided by a simple snap ring or the like as desired. Flow from the center coupling recess 82 to the coupling recess 81, in a reverse direction, will flow substantially unrestricted through the tubular passage 96 and unseat the ball 99 from its seat 98 to flow substantially unrestricted through this multi-stage restrictor 73.

The multi-stage bi-directionally operative fluid flow restrictor 74, however, is operative to restrict fluid flow therethrough in either direction through a plurality of stages constituted by pairs of high and low turbulence chambers, of which there are three such pairs 102, 103; 104, 105; and 106, 107 in this example. Each pair of chambers is arranged substantially as they are arranged in the embodiment of Figures 5, 6 and 7 whereby they are substantially cylindrical chambers of relatively small axial dimension and are axially intercommunicated through knife edge orifices 108, 109 and 110 in each pair respectively. Further, the pairs are intercommunicated through orifices or apertures 111 and 112 extending between the chambers 103, 105 and 104, 106 respectively and in substantially tangential communication with the cylindrical side walls thereof respectively. With this arrangement fluid flow in either direction through the restrictor 74 will be subjected to multi-stage energy and pressure and/or flow rate losses. As an example, flow from the threaded coupling recess 83 will be directed through a port 113 in the bottom face 114 thereof substantially tangentially into the first high turbulence restriction chamber 102 for restricted high turbulence centripetal flow therethrough. Flow from the chamber 102 will be substantially axial through the knife edge orifice 108 into the first low turbulence chamber 103 from which the fluid will pass through the orifice 111 substantially tangentially into the second high turbulence chamber 105 in which the fluid will flow centripetally and with high turbulence to the knife edge axial port orifice 109. Fluid flowing from the orifice 109 will enter the second low turbulence chamber 104 and leave the same through the port 112 to enter third stage high turbulence chamber 106 substantially tangentially for centripetal flow turbulently therethrough and through the knife edge orifice 110 into the third stage low turbulence chamber 107 from which the fluid will flow through an outlet port 115 through the bottom wall 116 of the threaded coupling recess 84. When fluid flow is in a reverse direction it will be restricted through these same stages but with the turbulence chambers 107, 104 and 103 operating as high turbulence chambers and with the chambers 106, 105 and 102 operating as low turbulence chambers for this multi-stage restriction of fluid flow to reduce its pressure adequately, and/or flow rate.

It will be understood from the foregoing that embodiments of the principles of the present invention and the structures and methods of the present invention provide for a fluid restriction without filters and without packing rings, further not susceptible of clogging under ordinary operating conditions and are fully and completely operative substantially irrespective of the viscosity and/or the temperature of the fluid. These and such other features as solid and ultimately one-piece construction and the convenient preadjustment and precalculation of the operating characteristics thereof make such embodiments extremely economical and highly desirable and give them a long life free from maintenance and repair and replacement of parts.

From the foregoing it will also be seen that numerous variations and modifications may be made without departing from the true spirit and scope of the novel concepts and principles of this invention. I therefore, intend to cover all such modifications and variations as fall within the true spirit and scope of the novel concepts and principles of my invention.

I claim as my invention:

1. In a reversible fluid energy dissipating device adapted to reduce fluid flow rate and pressure, a housing having a plurality of right circular cylindrical chambers therein, said chambers having axially aligned cylindrical walls, parallel spaced outer end walls and a common inner end wall the opposite sides of which are parallel to said outer end walls, an inlet in said housing leading into a first of said cylindrical chambers substantially tangentially of the cylindrical wall thereof, a communicating passageway between said chambers leading through the common inner wall thereof coaxially with the axes of said cylindrical walls, and an outlet in said housing from said second cylindrical chamber leading therefrom substantially tangentially of the wall thereof, whereby said outlet serves as an inlet upon the reverse flow of fluid through said energy dissipating device.

2. In a reversible fluid energy dissipating device for reducing fluid flow rate and pressure, a housing having first and second substantially right circular cylindrical chambers therein, said chambers having axially aligned cylindrical walls, parallel spaced outer end walls and a common inner wall having opposite sides parallel to said outer end walls, a communicating flow passageway between said chambers through said common inner end wall coaxial with the axes of said cylindrical walls and having a knife-edge orifice therein, a flow passageway in one end of said housing communicating with one of said chambers substantially tangentially thereof, and a flow passageway in the opposite end of said housing communicating with the other of said chambers substantially tangentially thereof, said flow passageways being inlet and outlet passageways dependent upon the direction of flow through said energy dissipating device.

References Cited in the file of this patent

UNITED STATES PATENTS

| 827,381 | Manzel | July 31, 1906 |
| 1,517,598 | Stevenson | Dec. 2, 1924 |
| 1,839,616 | Thoma | Jan. 5, 1932 |
| 2,393,280 | Berger | Jan. 22, 1946 |
| 2,619,124 | Bertin et al. | Nov. 25, 1952 |
| 2,642,895 | Bertin et al. | June 23, 1953 |
| 2,705,972 | Vawter | Apr. 12, 1955 |

FOREIGN PATENTS

| 216,915 | Germany | Dec. 7, 1909 |
| 670,101 | Great Britain | Apr. 16, 1952 |
| 806,787 | France | Oct. 5, 1936 |